(12) United States Patent
Chang

(10) Patent No.: US 7,673,989 B2
(45) Date of Patent: Mar. 9, 2010

(54) TELEMICROSCOPIC LOUPES WITH REMOVABLE, REPLACEABLE LENS CAP TO ADJUST FOR WORKING DISTANCE

(75) Inventor: Byung Jin Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 533 days.

(21) Appl. No.: 11/346,769

(22) Filed: Feb. 3, 2006

(65) Prior Publication Data
US 2006/0192917 A1    Aug. 31, 2006

Related U.S. Application Data

(60) Provisional application No. 60/649,881, filed on Feb. 3, 2005, provisional application No. 60/650,331, filed on Feb. 4, 2005.

(51) Int. Cl.
*G02C 9/00* (2006.01)
(52) U.S. Cl. ...................................................... 351/57
(58) Field of Classification Search ................ 351/41, 351/158, 57; 359/379–384, 827
See application file for complete search history.

(56) References Cited

U.S. PATENT DOCUMENTS

| 3,522,983 | A | * | 8/1970 | Daniels Erwin | 359/481 |
| 5,291,229 | A | * | 3/1994 | Feinbloom | 351/57 |
| 5,299,067 | A | * | 3/1994 | Kutz et al. | 359/827 |
| 7,072,124 | B2 | * | 7/2006 | Wilt et al. | 359/744 |

* cited by examiner

*Primary Examiner*—Hung X Dang
(74) *Attorney, Agent, or Firm*—Gifford, Krass, Sprinkle, Anderson & Citkowski, P.C.

(57) ABSTRACT

An improvement upon telemicroscopic loupes of the type which are adjustably mounted to an eyeglass frame, headmount or through-lens designs. The preferred embodiment includes a cap including an optical element to adjust for the working distance of a loupe. The cap may be frictionally fit onto the loupe or threadably attached to the loupe body. According to an alternative embodiment, one or more eyepiece components may be used alone or in combination with the end cap for adjusting prescription and/or working distance.

4 Claims, 1 Drawing Sheet

TELEMICROSCOPIC LOUPES WITH REMOVABLE, REPLACEABLE LENS CAP TO ADJUST FOR WORKING DISTANCE

REFERENCE TO RELATED APPLICATION

This application claims priority to U.S. Provisional Patent Application Ser. Nos. 60/649,881, filed Feb. 3, 2005 and 60/650,331, filed Feb. 4, 2005, the entire content of both of which are incorporated herein by reference.

FIELD OF THE INVENTION

This invention relates generally to telemicroscopic loupes for medical, surgical and dental applications and, in particular, to loupes with removable, replaceable end caps to adjust for working distance and other optical parameters.

BACKGROUND OF THE INVENTION

Telemicroscopic instruments are widely used for magnifying a work area during precision work such as delicate surgery, dental work, inspection of circuit board solder joints, and assembly of miniature parts. A typical telemicroscopic instrument includes a pair of telemicroscopic loupes which are adjustably mounted to an eyeglass frame, head mount, or through lenses. The telemicroscopic loupes combine the long working distance of the telescope with the high quality magnification of the microscope.

This type of optical instrument provides the user with a magnified image of the work area with a field of view at about arm's length. However, conventional lens configurations for these instruments include fixed or permanent optical components used to adjust for working distance and prescription, requiring different models for different users. Accordingly, there has been a need for a light and compact telemicroscopic lens configuration having a more versatile optical configuration.

SUMMARY OF THE INVENTION

This invention improves upon telemicroscopic loupes of the type which are adjustably mounted to an eyeglass frame, headmount or through-lens designs. The preferred embodiment includes a cap including an optical element to adjust for the working distance of a loupe. The cap may be frictionally fit onto the loupe or threadably attached to the loupe body. According to an alternative embodiment, one or more eyepiece components may be used alone or in combination with the end cap for adjusting prescription and/or working distance.

DETAILED DESCRIPTION OF THE INVENTION

Figure 1:
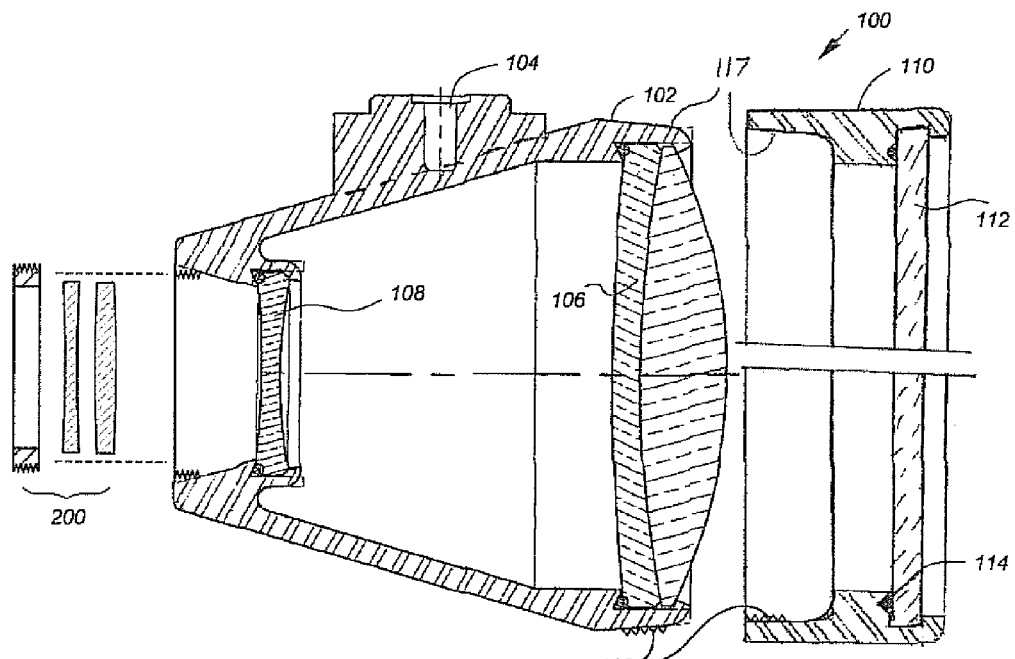
FIG. 1 depicts a preferred embodiment of the invention.

This invention improves up the existing art by providing a telemicroscopic loupe with a removable, replaceable end cap to adjust for working distance. A preferred embodiment, depicted generally at 100 in Figure, includes a loupe body 102 and a connector 104, not critical to the invention for loupe mounting. Lens elements 106 and 108 form the telemicroscope proper, including a nominal working distance.

According to the invention, however, there is provided a lens cap, having a body 110 and lens element 112, seated in place using O-ring 114, which fits over the loupe body 102 to adjust for working distance. For example, given a working distance on the order of 16 inches, the cap 110 may be placed over the loupe body 102 to adjust working distance to 12 or 18 inches, or thereabouts. The cap 110 may provide a slip fit or frictional fit depicted with surfaces 117, or a threaded fit utilizing optional threads 116. According to the invention, then, if the working distance is set at 16 inches, the lens element 110 may be provided to adjust for a working distance of, say, 14-20 inches, or thereabouts.

Figure 2:
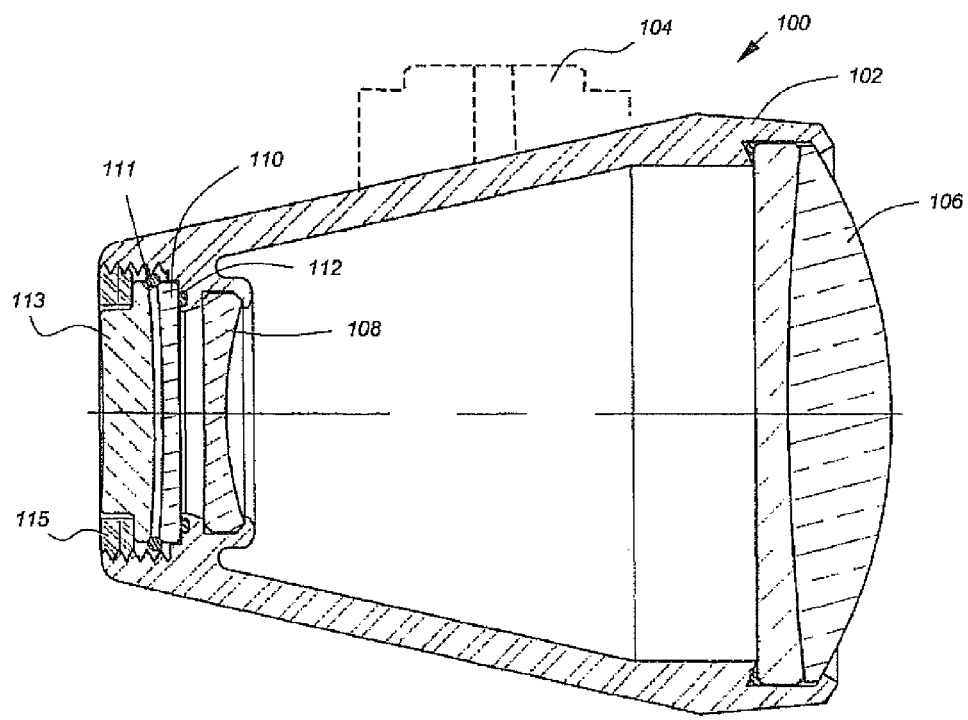
FIG. 2 shows the mounting of other optical elements.

Optionally, one or more removable, replaceable components 200 may be mounted at the other end of the loupe, with or without the opposite cap, to adjust for user prescription, modify working distance, etc. Both convex and/or concave elements may be used to increase or shorten the working distance. FIG. 2 shows the mounting of these additional elements. For example, a second eyepiece optical element 113 may be provided to adjust for working distance and/or user prescription. Any suitable working distance and adjustment of the working distance are possible according to the invention by virtue of the optical design apparent to those of skill in the art. The elements 110 and/or 113 are held in place by a retaining ring 115, and O-ring 111, 112 are used for secure yet resilient seating.

I claim:

1. A telemicroscopic loupe, comprising:
   a telemicroscopic loupe body having a proximal end and a distal end;
   a removable, replaceable cap configured to fit over the distal end of the loupe body, the cap including an optical element to adjust for the working distance of the loupe;
   at least one eyepiece optical element supported in the proximal end of the loupe body; and
   wherein the eyepiece element is held in position with a threaded retaining ring enabling the element to be removed and replaced to adjust for prescription and/or working distance.

2. The loupe of claim 1, wherein the cap is frictionally fit onto the loupe body.

3. The loupe of claim 1, wherein the cap is threadably attached to the loupe body.

4. The loupe of claim 1, wherein the loupe body includes a connector to facilitate adjustable mounting to eyeglass frames.

* * * * *